United States Patent [19]

Patchett et al.

[11] 4,066,994

[45] Jan. 3, 1978

[54] WELL DATA TELEMETRY BY EXPLOSIONS

[75] Inventors: Jay G. Patchett; Charles F. Hadley, both of Tulsa, Okla.

[73] Assignee: Standard Oil Company (Indiana), Chicago, Ill.

[21] Appl. No.: 742,490

[22] Filed: Nov. 17, 1976

[51] Int. Cl.² .............................................. G01V 1/40
[52] U.S. Cl. ................................ 340/18 NC; 175/4.55; 175/50; 181/103
[58] Field of Search ...................... 340/18 NC, 18 LD; 181/103, 107; 175/1, 4.54, 4.55, 50

[56] References Cited

U.S. PATENT DOCUMENTS

| | | | |
|---|---|---|---|
| 1,926,327 | 9/1933 | Burrell et al. | 340/18 NC |
| 2,062,151 | 11/1936 | Weatherby | 175/1 |
| 2,992,694 | 7/1961 | Musgrave et al. | 181/107 |
| 3,773,120 | 11/1973 | Stroud et al. | 175/4.55 |
| 3,971,317 | 7/1976 | Genupnell | 340/18 NC |

Primary Examiner—Howard A. Birmiel
Attorney, Agent, or Firm—Albert C. Metrailer; Arthur McIlroy

[57] ABSTRACT

A data telemetry system for use in a plugged exploratory borehole to transmit measurements of subsurface conditions after long delays by use of seismic waves. The system includes a sensor for detecting a downhole condition, such as temperature, and converting it to electrical signals, a timer, and a series of explosive charges. The timer detonates a first of the charges at a preselected time delay and a second charge at a further time delay corresponding to the electrical output of the sensor. The seismic waves generated by the explosions are detected by a seismometer on the earth's surface near the exploratory borehole.

7 Claims, 3 Drawing Figures

WELL DATA TELEMETRY BY EXPLOSIONS

BACKGROUND OF THE INVENTION

This invention relates to borehole telemetry systems for transmitting indications of subsurface conditions to the earth's surface and, more particularly, to a borehole telemetry system using explosive seismic sources to transmit signals to the earth's surface.

Numerous devices have been developed for the detection of subsurface conditions such as temperature and pressure in a borehole. An example is U.S. Pat. No. 3,905,010 issued to John Fitzpatrick on Sept. 9, 1975. The device disclosed by this patent includes pressure and temperature transducers which generate electrical outputs representative of these two formation parameters. These outputs are converted to electromagnetic radiation in the microwave range which is then transmitted up a tubing string to a receiver at the surface. Also disclosed in the patent is the use of fiber optics and modulated laser beams to transmit the same energy to the surface.

Other downhole sensing systems are known in which acoustic waves are used to transmit energy to the earth's surface. Most typically, these involve an acoustic transmitter which generates waves in the drilling fluid, which then travel in the fluid in a casing string to the earth's surface. Other devices are known which generate acoustic waves in the well casing, which then travel up the well casing to the earth's surface to be detected there. Variable frequency mud sirens have been used in logging while drilling operations which transmit energy by means of acoustic waves traveling through the drilling fluid in the drill string.

Numerous sensors are also known such as that disclosed in U.S. Pat. No. 2,718,145 issued to Nisle on Sept. 20, 1955. This transducer generates an electrical resistance change proportional to pressure being detected and must be directly connected by means of wires to either a telemetering or recording device.

Exploratory wells are sometimes drilled solely for the purpose of obtaining core samples and logging measurements of the subsurface formations. Quite often, wells drilled for the purpose of production of oil and gas turn out to be dry holes and thus are useful only for the information they can yield toward a better understanding of the formations in that area. Subsurface temperature and pressure are two of the parameters which aid geologists in understanding the subsurface conditions. Both of these parameters are changed by the process of drilling a borehole, and measurement of them at that time or shortly thereafter is not as valuable as a measurement after the temperatures and pressures have returned to their original states. Many of the known devices for measuring such parameters, such as those mentioned above, depend upon the presence of casing or drill strings to transmit the signals back to the surface. These expensive materials are not normally left in exploratory or dry holes.

While sensors coupled to the surface by means of electrical conductors can be placed in uncased boreholes, there are several problems. It is difficult to place a sensing device at the bottom of the borehole with wires connecting it to the surface without damaging those wires in the process of placing the device in the hole. Such boreholes must be plugged with concrete before they are abandoned. The cementing operation also requires operations within the hole which can damage wires. In addition, most state drilling regulations do not consider a well to be properly plugged if wires are left in the borehole so that they pass through the plug.

It is conceivable that some of the known acoustic generating devices could be used at the bottom of a plugged, abandoned borehole; but, without the presence of casing or drill string to act as a conduit for the acoustic energy, the energy output of such devices would have to be greatly increased to be detectable at the earth's surface. With present devices, the energy for such transmissions would have to be stored in batteries within the device. Since pressure and temperature conditions vary slowly and over long time intervals, it is desirable to detect such signals and transmit them to the surface at intervals in the range of weeks or months. At the present time, it is not practical to provide batteries with sufficient stored energy to generate the required level of acoustic energy even for a short period of time, much less repetitively over a long period of time.

Accordingly, an object of the present invention is to provide an improved downhole sensing and telemetering device capable of transmitting acoustic waves indicative of downhole conditions at time intervals long after the borehole is plugged.

Another object of the present invention is to provide a relatively inexpensive and simple downhole sensing and telemetering device which employs explosive charges as a source of transmitted acoustic energy.

A downhole sensing and telemetering device, according to the present invention, comprises a sensor such as a temperature sensor, a timer, and a series of individual explosive charges. The sensor provides an electrical output which is a function of the parameter, such as temperature, being detected. The timer provides at least two time intervals, the first time interval being a delay time such as one week at which information will be transmitted, and the second time interval being proportional to the parameter being transmitted. A first of the charges is detonated at the end of the delay time interval and a second at the end of the second time interval.

BRIEF DESCRIPTIONS OF THE DRAWINGS

The present invention may be more fully understood by reading the following detailed description with reference to the accompanying drawings wherein.

DESCRIPTION OF THE PREFERRED EMBODIMENT

Figure 1:
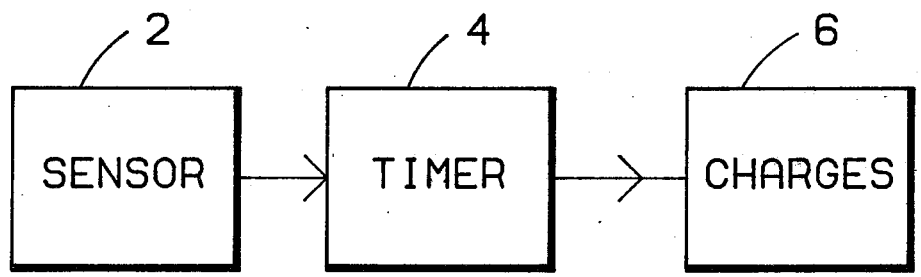
FIG. 1 is a general block diagram of a downhole sensing and telemetering device according to the present invention.

The general block diagram of FIG. 1 illustrates the basic arrangement of a downhole device according to the present invention. The first major portion is a sensor 2 which may be a pressure detector such as that disclosed in above-referenced U.S. Pat. No. 2,718,145. Any commercially available sensor of a downhole condition which provides an electrical output proportional in some way to the parameter being detected may be used as sensor 2. In addition, as will be explained more fully below, more than one sensor may be used so that, for example, both temperature and pressure may be detected and transmitted to the surface. The second basic element illustrated in FIG. 1 is a timer 4. Timer 4 provides two basic timing functions. The first is to provide a delay time at which the parameter being detected is measured and transmitted to the surface. For parameters such as temperature and pressure, this delay time will typically be on the order of a week or a month. The timer may also be programmed to provide nonuniform time intervals such as first a week, then a month, then a year. The second basic function of timer 4 is to convert the electrical output of sensor 2 to a time interval representative of the electrical output. For example, if sensor 2 provides an output in which 1/10 volt represents 1 deg Centigrade, timer 4 may generate a time interval of 10 seconds per volt of output from sensor 2. Timer 4 generates electrical pulses at the end of the long time delay interval and the parameter indicating interval.

The third major portion of the downhole device is the charges section 6. The charges 6 should be physically separated from the rest of the downhole equipment comprising sensor 2 and timer 4, and connected to timer 4 by means of an electrical conducting cable. As each electrical pulse is generated by timer 4, the charge section 6 detonates one explosive charge to generate an acoustic impulse detectable at the earth's surface. The charge section 6 will be described in more detail with reference to FIG. 3 below.

Figure 2:
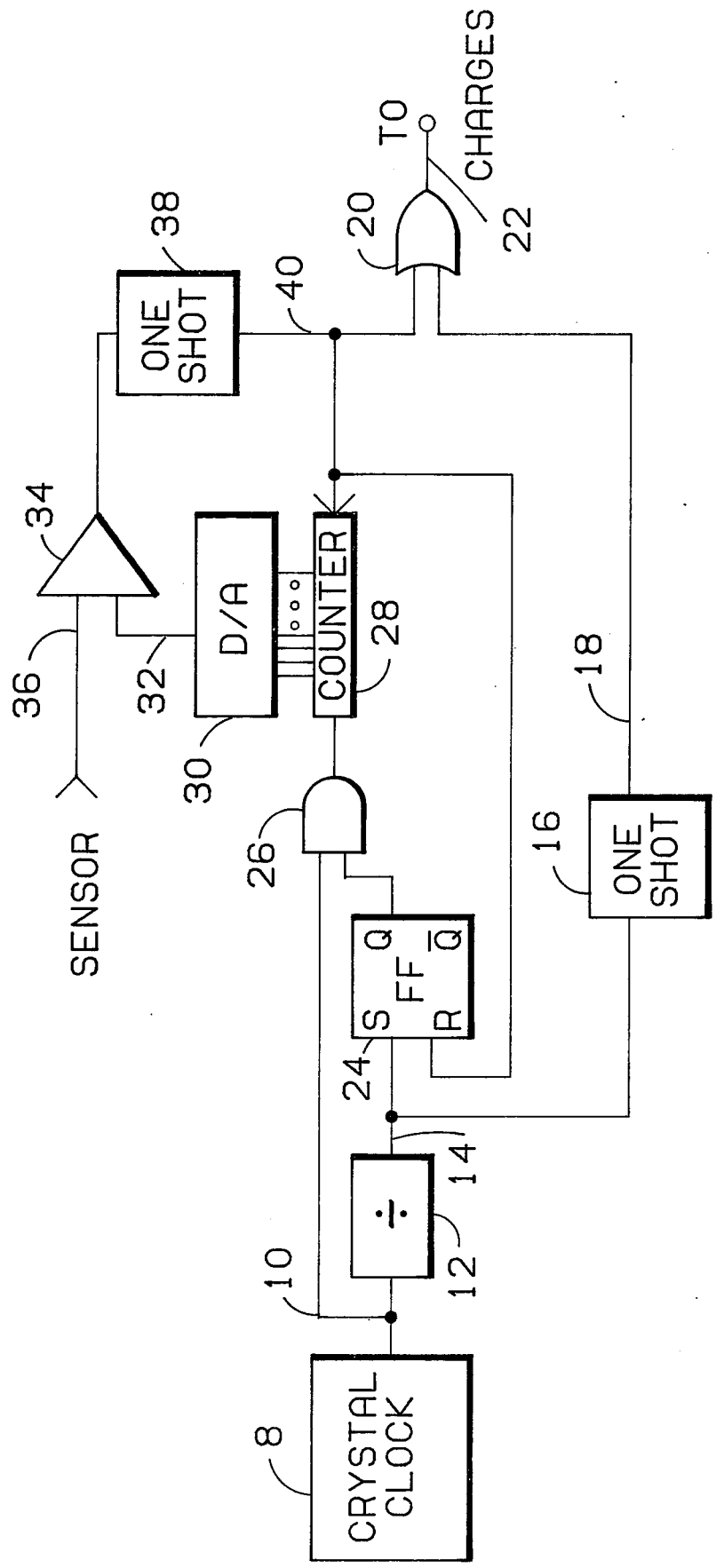
FIG. 2 is a logic diagram of the timer of FIG. 1.

With reference to FIG. 2, there is shown one form of the timer 4 of FIG. 1. The basic timing element of timer 4 is a crystal clock 8. A crystal clock was chosen for the preferred embodiment to provide high accuracy for the long time delays. In the preferred embodiment, the output of crystal clock 8 is internally divided so that it provides on output line 10 short pulses at a 1 second repetition rate. Output 10 of clock 8 is coupled to an input of a divider 12. The number of pulses which divider 12 must receive on its input before it provides an output pulse on output line 14 determines an initial long time delay. As an example, with the one-pulse-per-second input received from clock 8, a one-week time delay may be obtained by setting timer 12 to divide by the number 604,800, which is the number of seconds in a week. The design of such dividers is well known and may be arranged to provide consecutive pulses on the same time interval, such as one week, or on progressively increasing time intervals, such as one week, then two weeks, then four weeks as desired. Output 14 of divider 12 is coupled to an input of a one shot 16. One shot 16 generates a pulse on its output line 18 each time it receives a pulse on its input. Output 18 of one shot 16 is coupled to one input of an OR gate 20. The pulse on line 18 passes through OR gate 20 and appears on output 22 which is coupled to the charge section 6 of FIG. 1 and FIG. 3. As will be explained with reference to FIG. 3 below, each pulse which appears on output 22 triggers the detonation of one of the charges in section 6.

The time delay output pulse generated by divider 12 on line 14 is also coupled to the set input of a flip flop 24. An input pulse received by the set input of flip flop 24 causes its Q output to go to a high or true state. The Q output of flip flop 24 is coupled to one input of an AND gate 26. A second input to AND gate 26 is connected to output lead 10 of clock 8. When AND gate 26 is enabled by having the Q output of flip flop 24 in a true state, the clock pulses on line 10 pass through gate 26 to the count input of a counter 28. Counter 28 provides a digital output indicative of its total count on a plurality of lines coupled to a digital-to-analog converter 30. D/A 30 provides an analog output on a line 32 proportional to the total digital count in counter 28. Output 32 is coupled to one of two inputs to a comparator 34. A second input 36 of comparator 34 receives the electrical output of sensor 2 of FIG. 1. It can be seen from this arrangement that the comparator input 32 increases substantially linearly with time. When the voltage on input 32 reaches the level on input 36, the output of comparator 34 switches from a low to high state. The output of comparator 34 is coupled to the trigger input of a second one shot 38. In response to the transition of the output of comparator 34, one shot 38 generates a short pulse on lead 40. Lead 40 is coupled to a second input of OR gate 20 and the pulse passes through OR gate 20 to output 22 to cause the detonation of a second charge in charge section 6. Line 40 is also coupled to a reset input of counter 28 and flip flop 24. In response to the pulse on line 40, counter 28 clears itself to a zero state in preparation for the next encoding sequence. At the same time, flip flop 24 resets itself so that its Q output goes to a low state and disables AND gate 26. Counter 28 is thereby prevented from receiving any more clock pulses until another long time delay pulse is received from divider 12.

While the timing unit of FIG. 2 has been illustrated in terms of encoding only one sensor output, it is clear that the same basic unit may be used to encode a plurality of sensor outputs. For example, the pulse which appears on line 40 could be coupled to the set input of another flip flop similar to flip flop 24 which could control another encoding section comprising the elements such as AND gate 26, counter 28, D/A 30, and comparator 34. Such a cascade arrangement could be extended to any number of desired parameters. It should be noted that the extension of the device to a plurality of parameters increases the efficiency in terms of the number of explosive charges needed per parameter value transmitted to the surface. For a single parameter, two charges must be detonated so that a time interval may be defined. A second parameter may be transmitted by exploding only one more charge with the time interval between the second and third charge representing that parameter. Only one charge is needed for each parameter after the first one.

Figure 3:
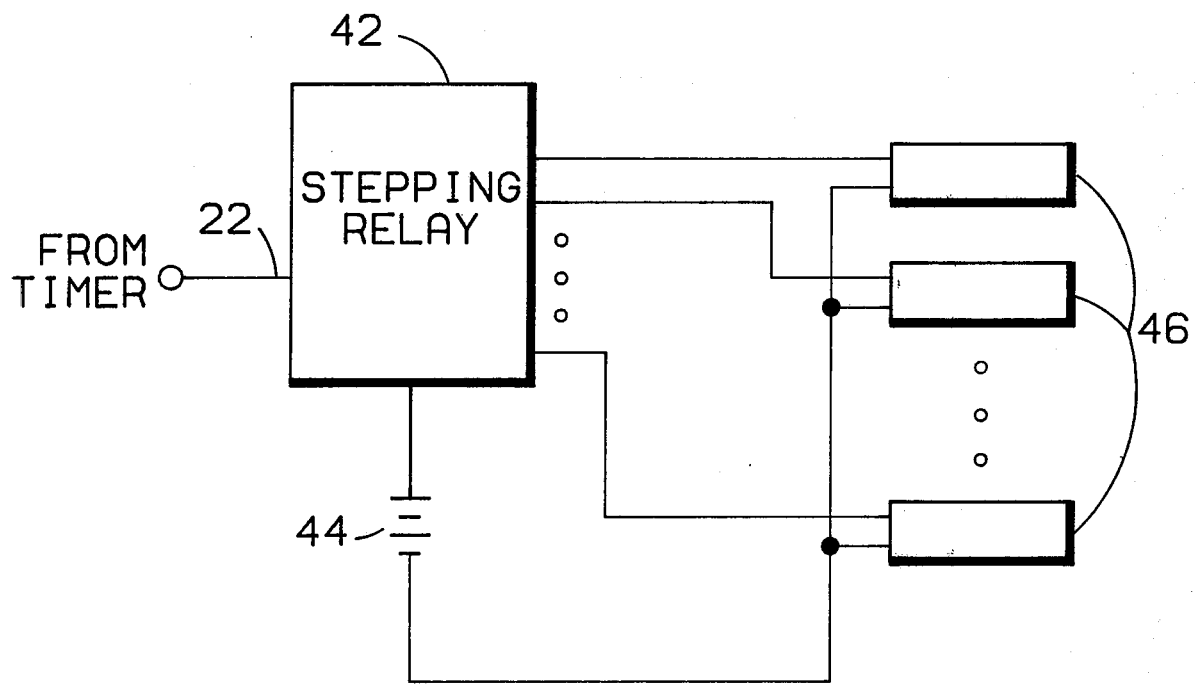
FIG. 3 is a block diagram of the explosive charge section of FIG. 1.

FIG. 3 illustrates in block diagram form a simple arrangement for successive detonation of a plurality of charges. Lead 22 from OR gate 20 in FIG. 2 is connected to the stepping or coil input of a stepping relay 42. The wiper of relay 42 is connected to one terminal of a battery 44. A series of charges 46 each have one terminal connected in parallel to the other terminal of battery 44. Each of the other terminals of charges 46 are connected to one of the output contacts of relay 42. Relay 42 is initially set in an open position and moves on successive input pulses on lead 22 to positions connecting battery 44 across the inputs of each of the explosive devices 46. In this manner, one charge is detonated for each pulse which occurs on line 22.

Most of the problems of detonating explosive charges under the severe environmental conditions experienced in boreholes have been solved by years of experience in the field of perforating devices designed for oil well use. In the preferred embodiment, therefore, the charge section 6 of FIGS. 1 and 3 is simply a commercially available perforating device. Such devices are available as self-contained units which may be conveniently positioned in the borehole at some distance below a sonde containing sensor 2 and timer 4 of FIG. 1. The purpose of this spacing is to reduce the effects on the temperature and pressure in the subsurface formation caused by the explosive charges themselves. But since this spacing is much shorter than the distance to the earth's surface, a short section of armored cable may be used economically to connect the timer 4 to the explosive device 6. One suitable perforating gun is that disclosed in U.S. Pat. No. 3,301,185 issued to J. L. Foster on Jan. 31, 1967. The device disclosed by this patent includes the equivalent of stepping relay 42 and, thus, may be connected directly to output 22 of gate 20 to provide the desired function of charge section 6.

While in the preferred embodiment the downhole equipment, in effect, comprises two sondes connected by a short length of cable, it is apparent that this cable is not in that portion of the borehole which must be plugged with concrete to meet state drilling requirements.

In addition to spacing the charges section 6 physically away from the sensor 2 to reduce the effect of the explosions on the readings, additional electrical circuitry may be added to reduce the effect. This circuitry would amount to a sample and hole circuit placed between sensor 2 and input 36 to comparator 34 of FIG. 2. Output lead 14 from divider 12 would be coupled to this sample and hold circuit to cause it to sample the sensor output at the end of each long time period delay which is also the beginning of the encoding time period. In this way, the sensor output would be sampled prior to the detonation of the first charge and would not be affected by such detonations. With the addition of such sample and hold circuitry, the spacing between charge section 6 and timer section 4 would need to be only enough to prevent physical damage to the electronics by the explosion of the charges.

In operation, the apparatus of the present invention comprises two cylindrical sondes interconnected by a short length of cable or tubing. The lower sonde carries a preselected number of explosive devices according to the number of parameters and signal transmissions which are desired. The upper sonde carries sensor 2 and timer 4 and has a borehole anchor by which the sonde may be fixed in a preselected position in the borehole. When the other work which is typically performed in an exploratory hole or dry hole has been completed, this apparatus is prepared for placement in the borehole. This preparation involves connecting batteries to power the sensor and timer electronics in the upper sonde and for firing the explosive charges in the lower sonde. In addition, divider 12 and counter 28 must be reset to zero states and flip flop 24 must be placed in a reset condition. An appropriate divider 12, having a preselected total count, must also be placed in the unit and the unit activated at a precisely known time so that the time of future transmission of information may be precisely known. After the equipment has been prepared and the timer activated at a known time, the equipment is then lowered into the borehole and anchored to the borehole wall at a preselected depth at which temperature and/or pressure measurements are to be made. The borehole may then be plugged with concrete above the equipment as required by the State regulations. Before the time delay has expired, a seismometer or group of seismometers is placed on the earth's surface near where the borehole was drilled. The seismometer outputs are coupled to a tape recording unit which is activated just before the time at which the first detonation is expected. The recording is continued for a sufficient time to record each of the detonations. When the recording is complete, the tape can be played back and the information plotted versus time so that the time spacing between detonations may be accurately measured. The time interval or intervals are then converted into the parameter being detected such as temperature or pressure. Future transmissions from the subsurface equipment are detected in precisely the same way according to the delay time intervals designed into divider 12 and the number of charges available for such transmissions.

Although the present invention has been illustrated in terms of specific apparatus, it is apparent that other changes and modifications of the equipment may be made within the spirit and scope of the invention as defined by the appended claims.

I claim:

1. Subsurface parameter measurement and telemetering apparatus for use at the bottom of a plugged borehole comprising:
    sensing means for sensing a subsurface parameter and generating an electrical signal related to the value of such parameter,
    timing means coupled to said sensing means for generating two time intervals, a first time interval being a preselected time delay interval and a second being a time interval proportional to the electrical signal generated by said sensing means, said timing means having an output for providing pulses at the end of each of said two time intervals,
    a plurality of charges which may be fired electrically, and
    firing means coupled to said timing means and to said charges for sequentially firing one of said charges in response to the generation of a pulse at the output of said timing means.

2. Apparatus according to claim 1 wherein the sensing means senses subsurface temperature.

3. Apparatus according to claim 1 wherein the sensing means senses subsurface pressure.

4. Apparatus according to claim 1 wherein said timing means includes a crystal oscillator as a time reference.

5. Apparatus according to claim 1 wherein said charges are perforating gun charges.

6. A method for telemetering the value of a subsurface formation parameter to the surface of the earth from a position in a plugged and abandoned borehole comprising:
    generating an electrical signal indicative of the formation parameter by means of a sensor placed in the borehole,
    generating two time intervals by means of an electronic timer placed in said borehole, a first of said time intervals being a preselected time interval at the end of which the parameter is to be measured and a second of said time intervals being proportional to the electric signal indicative of the formation parameter,
    detonating a first explosive charge in the borehole at the end of the first time interval and a second explosive charge in the borehole at the end of the second time interval.

7. A method according to claim 6 further including the steps of detecting the explosions by means of seismometers placed on the surface of the earth.